United States Patent
Kolanko et al.

(10) Patent No.: US 11,027,226 B2
(45) Date of Patent: Jun. 8, 2021

(54) TRAY UNIT FOR A WASTEWATER TREATMENT DEVICE AND A METHOD OF ASSEMBLING A TRAY ASSEMBLY FOR A WASTEWATER TREATMENT DEVICE

(71) Applicant: Hydro International Ltd, Clevedon (GB)

(72) Inventors: Anthony Tadek Leslie Kolanko, Bristol (GB); Joseph M. Cooley, Beaverton, OR (US)

(73) Assignee: Hydro International Ltd, Clevedon (GB)

( * ) Notice: Subject to any disclaimer, the term of this patent is extended or adjusted under 35 U.S.C. 154(b) by 0 days.

(21) Appl. No.: 16/640,163

(22) PCT Filed: Aug. 22, 2018

(86) PCT No.: PCT/GB2018/052388
§ 371 (c)(1),
(2) Date: Feb. 19, 2020

(87) PCT Pub. No.: WO2019/038545
PCT Pub. Date: Feb. 28, 2019

(65) Prior Publication Data
US 2020/0368643 A1 Nov. 26, 2020

Related U.S. Application Data

(60) Provisional application No. 62/548,828, filed on Aug. 22, 2017.

(30) Foreign Application Priority Data

Nov. 21, 2017 (GB) .................................. 1719348

(51) Int. Cl.
*B01D 21/02* (2006.01)
*B01D 21/00* (2006.01)
(Continued)

(52) U.S. Cl.
CPC ..... *B01D 21/0045* (2013.01); *B01D 21/0003* (2013.01); *B01D 21/0063* (2013.01);
(Continued)

(58) Field of Classification Search
CPC ............ B01D 21/0003; B01D 21/0039; B01D 21/0042; B01D 21/0045; B01D 21/0069
(Continued)

(56) References Cited

U.S. PATENT DOCUMENTS 1,020,013 A  3/1912 Arbuckle
1,701,068 A  2/1929 Flowers
(Continued)

FOREIGN PATENT DOCUMENTS

EP  0671197  * 9/1995
GB  1092291 A  11/1967
(Continued)

OTHER PUBLICATIONS

International Search Report for Application PCT/GB2018/052388 dated Jun. 24, 2019.
(Continued)

*Primary Examiner* — Christopher Upton
(74) *Attorney, Agent, or Firm* — Honigman LLP

(57) ABSTRACT

There is described a tray unit for a wastewater treatment device. The tray unit has a substantially frusto-conical profile defining an axis and a central aperture. The tray unit comprises a plurality of distinct tray sections arranged around the axis. Each tray section comprises a portion of the substantially frusto-conical profile of the tray unit and is connectable to one or more of the other tray sections so as to form the tray unit. There is also described a method of assembling a tray assembly for a wastewater treatment device. The method comprises the steps of: providing a plurality of tray units, the tray units each having a substan-
(Continued)

tially frusto-conical profile and a central aperture and comprising a plurality of connecting lugs each defining a hole; attaching a first one of the tray units to a plurality of support members by inserting the support members through the hole of the connecting lug of the first tray unit and securing the first tray unit to the support member; and attaching a second one of the tray units to the plurality of support members by inserting the support members through the hole of the connecting lug of the second tray unit and securing the second tray unit to the support member to form an assembly of tray units.

21 Claims, 17 Drawing Sheets

(51) Int. Cl.
  *B01D 21/26* (2006.01)
  *C02F 1/38* (2006.01)
  *B29C 41/04* (2006.01)
  *C02F 1/00* (2006.01)
(52) U.S. Cl.
  CPC ....... *B01D 21/0069* (2013.01); *B01D 21/265* (2013.01); *C02F 1/38* (2013.01); *B29C 41/04* (2013.01); *C02F 2001/007* (2013.01)
(58) Field of Classification Search
  USPC .................................. 210/801, 802, 521, 522
  See application file for complete search history.

(56) References Cited

U.S. PATENT DOCUMENTS

| | | | | |
|---|---|---|---|---|
| 2,307,154 A | * | 1/1943 | Osuna ................ | B01D 21/0003 210/522 |
| 3,718,257 A | * | 2/1973 | Bach .................. | B01D 21/0045 210/802 |
| 4,921,609 A | * | 5/1990 | Fromson ............ | B01D 21/0045 210/521 |
| 5,252,205 A | * | 10/1993 | Schaller ............. | B01D 21/0042 210/521 |
| 7,416,662 B2 | * | 8/2008 | Aditham ............ | B01D 21/0003 210/521 |
| 8,342,338 B2 | * | 1/2013 | Andoh ............... | B01D 21/0042 210/521 |

FOREIGN PATENT DOCUMENTS

| | | |
|---|---|---|
| GB | 2354466 A | 3/2001 |
| WO | WO-9323334 A1 | 11/1993 |
| WO | WO-96004058 A1 | 2/1996 |

OTHER PUBLICATIONS

International Preliminary Report on Patentability for Application PCT/GB2018/052388 dated Jan. 10, 2020.

* cited by examiner

TRAY UNIT FOR A WASTEWATER TREATMENT DEVICE AND A METHOD OF ASSEMBLING A TRAY ASSEMBLY FOR A WASTEWATER TREATMENT DEVICE

CROSS REFERENCE TO RELATED APPLICATIONS

This U.S. patent application is a national phase application of Patent Cooperation Treaty Application No. PCT/GB2018/052388, filed on Aug. 22, 2018, which claims priority to earlier-filed Great Britain Application No. 1719348.3, filed on Nov. 21, 2017, and earlier-filed U.S. Provisional Application No. 62/548,828, filed on Aug. 22, 2017. The disclosures of these prior applications are considered part of the disclosure of this application and are hereby incorporated by reference in their entireties.

FIELD

This invention relates to a tray unit for a wastewater treatment device and a method of assembling a tray assembly for a wastewater treatment device.

BACKGROUND

Wastewater treatment devices are known in which a plurality of trays are provided for removing grit from wastewater flow. Grit particles entrained in the wastewater flow settle on the sloping inner surface of each tray, whereupon the particles gravitate towards and pass through openings in the trays into a collection area. De-gritted wastewater flows over the trays for further processing.

Such trays can be costly to manufacture and difficult to transport. Further, the trays must meet specific requirements regarding shape and size to ensure optimal flow conditions within the wastewater treatment device. It is therefore desirable to provide a tray unit for a wastewater treatment device and a method of assembling a tray assembly for a wastewater treatment device that overcomes these issues.

SUMMARY

In accordance with a first aspect of the invention, there is provided a tray unit for a wastewater treatment device. The tray unit has a substantially frusto-conical profile defining an axis and a central aperture. The tray unit comprises a plurality of distinct tray sections arranged around the axis. Each tray section comprises a portion of the substantially frusto-conical profile of the tray unit and is connectable to one or more of the other tray sections so as to form the tray unit.

Each tray section comprises a first edge region and a second edge region. The first edge region is connectable to the second edge region of an adjacent tray section. The second edge region is connectable to the first edge region of an adjacent tray section.

The first edge region comprises at least one hole for connecting the first edge region to the second edge region of an adjacent tray section. The second edge region comprises at least one corresponding slot for connecting the second edge region to the first edge region of an adjacent tray section.

The at least one hole may be a circular hole.

The at least one hole may be a blind hole.

The at least one slot may be oriented in a circumferential direction with respect to the axis.

Each tray section may comprise a flange. The flange may define the first or second edge region.

The flange may be offset from a central portion of the tray unit in an outward direction.

At least one of the tray sections of the first aspect may comprise at least one connecting lug. The or each connecting lug of the first aspect may define a through hole for receiving a support member.

The connecting lug of the first aspect may be integrally formed with the remainder of the tray section.

The connecting lug of the first aspect may comprise a hollow channel extending between an inlet and an outlet. The inlet and the outlet of the first aspect may be formed in an outer rim of the tray section.

The tray sections may be substantially identical.

In accordance with a second aspect of the invention, there is provided a tray unit for a wastewater treatment device. The tray unit has a substantially frusto-conical profile defining an axis and a central aperture. The tray unit comprises an outer rim. The tray unit is configured to receive a flow of fluid within the outer rim. The tray unit comprises at least one connecting lug defining a hole for receiving a support member. The at least one connecting lug is integrally formed with the remainder of the tray unit.

The connecting lug comprises a hollow channel extending between an inlet and an outlet. The inlet is formed in the outer rim for receiving a portion of the fluid from within the outer rim, wherein the hollow channel is configured for passage of the portion of the fluid from the inlet to the outlet, and wherein the outlet is formed in the outer rim for discharging the portion of the fluid from the hollow channel to within the outer rim.

The frusto-conical profile of the tray unit may be formed by a plurality of portions separated by steps to increase the rigidity of the tray unit.

The tray unit may have a single wall thickness.

The tray unit or tray sections may be rotationally molded.

The tray assembly may comprise a plurality of tray units. The tray assembly may comprise one or more support members. Each of the plurality of tray units may be secured to at least one of the one or more tray units such that the tray units are spaced apart from each other along the axis.

A wastewater treatment device may be provided comprising a tray unit or assembly as described above.

In accordance with a third aspect of the invention, there is provided a method of assembling a tray assembly for a wastewater treatment device, the method comprising the steps of: providing a plurality of tray units, the tray units each having a substantially frusto-conical profile and a central aperture, the tray units each comprising an outer rim, the tray units each being configured to receive a flow of fluid within the outer rim, the tray units each comprising a plurality of connecting lugs each defining a hole and each comprising a hollow channel extending between an inlet and an outlet, wherein each inlet is formed in the outer rim for receiving a portion of the fluid from within the outer rim, wherein each hollow channel is configured for passage of the portion of the fluid from the inlet to the outlet, and wherein each outlet is formed in the outer rim for discharging the portion of the fluid from the hollow channel to within the outer rim; attaching a first one of the tray units to a plurality of support members by inserting the support members through the hole of the connecting lug of the first tray unit and securing the first tray unit to the support member; and attaching a second one of the tray units to the plurality of support members by inserting the support members through the hole of the connecting lug of the second tray unit and securing the second tray unit to the support member to form an assembly of tray units.

Prior to and during attachment to the support members, each of the tray units may be supported by a jig. The first tray unit may be removed from the jig following attachment to the support members by raising the assembly and may be replaced on the jig by the second tray unit.

The jig may comprise a plurality of separate jig frames.

The method may further comprise assembling a plurality of separate tray sections to form each of the tray units.

Each of the tray sections may be supported by each of the jig frames.

The jig frames may be used to support and maneuver the tray sections during assembly of each tray unit.

The support members may extend from a ring.

DRAWINGS

For a better understanding of the present invention, and to show more clearly how it may be carried into effect, reference will now be made, by way of example, to the accompanying drawings, in which.

DETAILED DESCRIPTION

Figure 1:
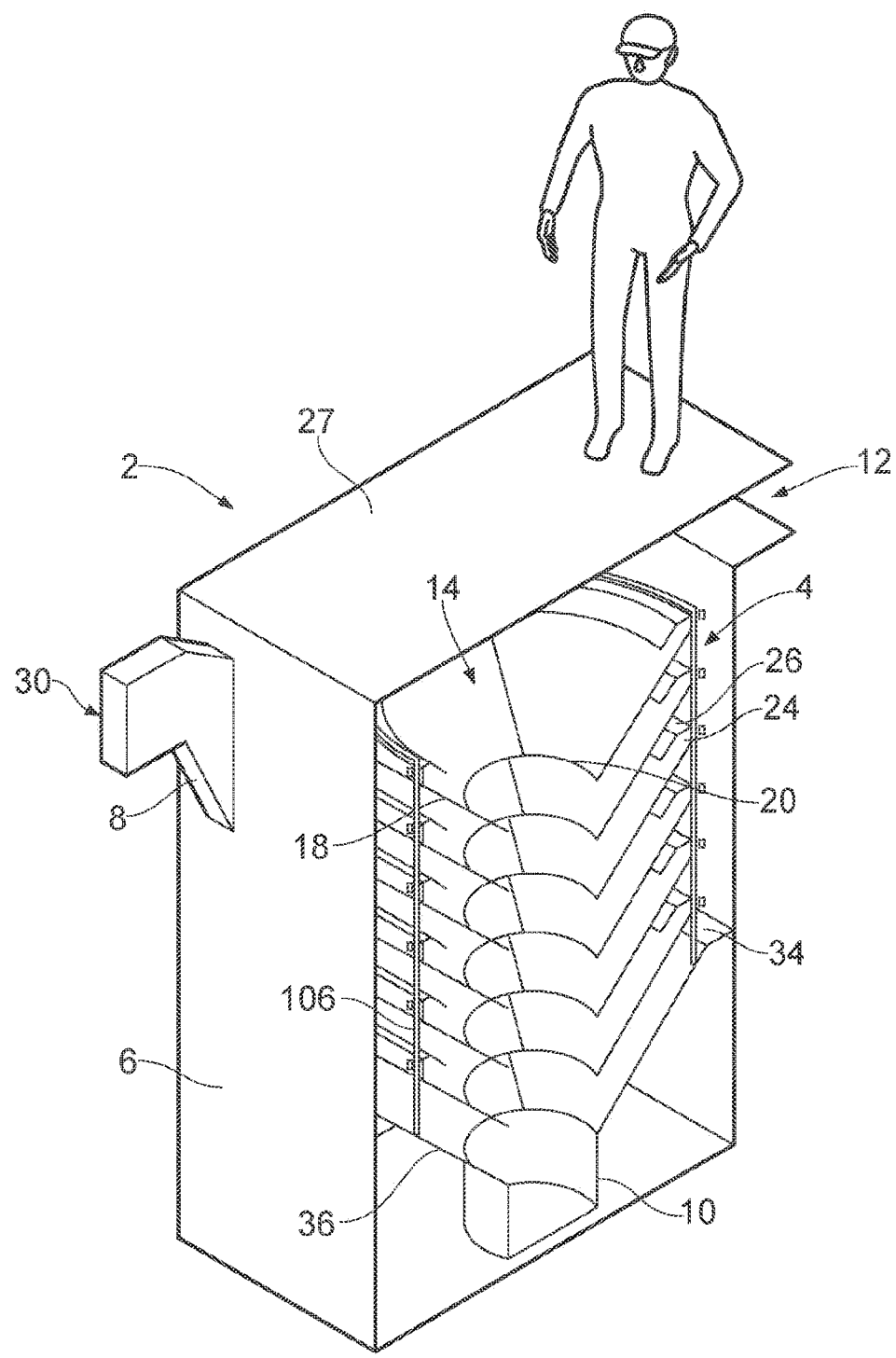
FIG. 1 is a perspective section view of a separator according to an embodiment of the invention.

FIG. 1 shows a separator 2 comprising a tray assembly 4 disposed within a treatment vessel 6. The tray assembly 4 comprises a plurality of nested tray units 14. Five tray units 14 are shown in FIG. 1, but it will be appreciated that the tray assembly could comprise more or fewer tray units 14. The nested tray units 14 define a separator axis 16, shown in FIGS. 2 and 3, which is upright and preferably substantially vertical. The tray units 14 are spaced apart from each other along the axis 16. The treatment vessel 6 is provided with an inlet chute 8 and a fluids outlet 12.

Each tray unit 14 comprises a generally frusto-conical tray 18, having a circular aperture 20 at the apex of the tray 18. The axis of the conical shape of the tray 18 is aligned with the separator axis 16. The tray 18 converges in a downward direction. A cylindrical rim 24 extends upwardly from the outer periphery of the tray 18 and an annular lip 26 extends radially inwardly from the extremity of the rim 24. The radially inward portion of the annular lip 26 is inclined so as to be parallel to the direction of the upper surface of the tray 18. The rim 24 and annular lip 26 are formed integrally with the tray 18 by a folded over portion of the tray 18. A support frame 106 connects the plurality of tray units 14 of the tray assembly 4 together and supports the tray assembly 4 within the treatment vessel 6.

Figure 2:
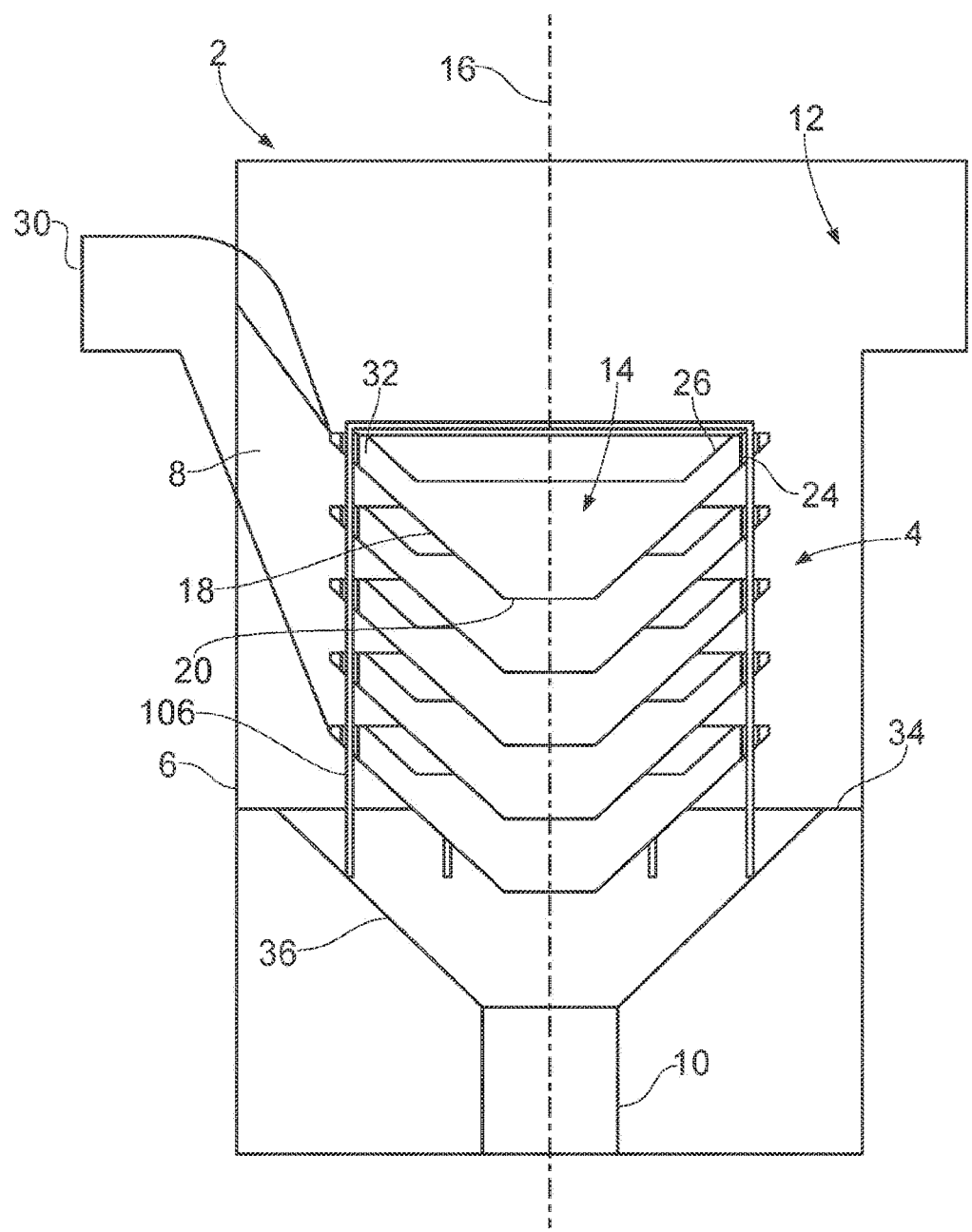
FIG. 2 is a sectional view of the separator.
Figure 3:
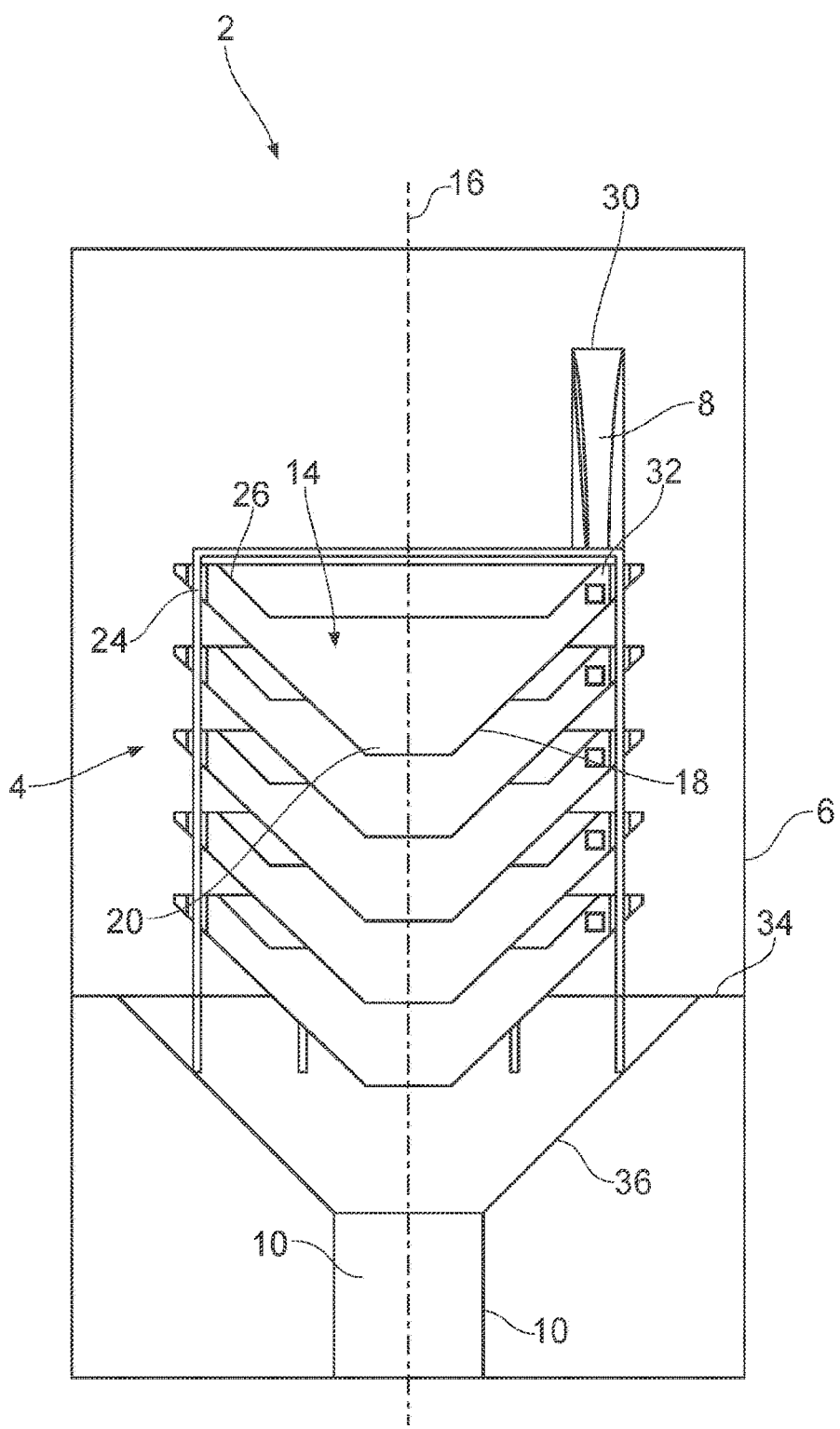
FIG. 3 is a sectional view of the separator taken in a direction perpendicular to that of FIG. 2.

Referring to FIGS. 2 and 3, the inlet chute 8 has a single inlet 30 and a plurality of outlets 32. The chute 8 extends into the treatment vessel 6 through an outer wall of the treatment vessel 6 and is in direct communication with the tray assembly 4. The mid-portion of the chute 8 is inclined in a downward direction from the inlet 30 to the outlets 32. The mid-portion of the chute 8 diverges in a vertical direction from the inlet 30 towards the outlets 32. The outlets 32 are aligned vertically and extend from the lower end of the mid-portion of the chute in a horizontal direction. Each of the outlets 32 is in direct communication with a respective tray unit 14 and arranged tangentially with respect to the separator axis 16. In particular, the outlets 32 are in direct communication with the region between the annular lip 26 and the upper surface of the tray 18.

A plate 34, provided with a funnel section 36, is disposed within the base of the treatment vessel 6. The plate 34 extends horizontally across the extent of the vessel 6 and the funnel section 36 converges in a downward direction. A grit pot 10 is provided in the lower region of the funnel section 36 and forms a sump for collecting grit at the base of the vessel 6. The funnel section 36 is arranged coaxially with the separator axis 16.

Figure 4:
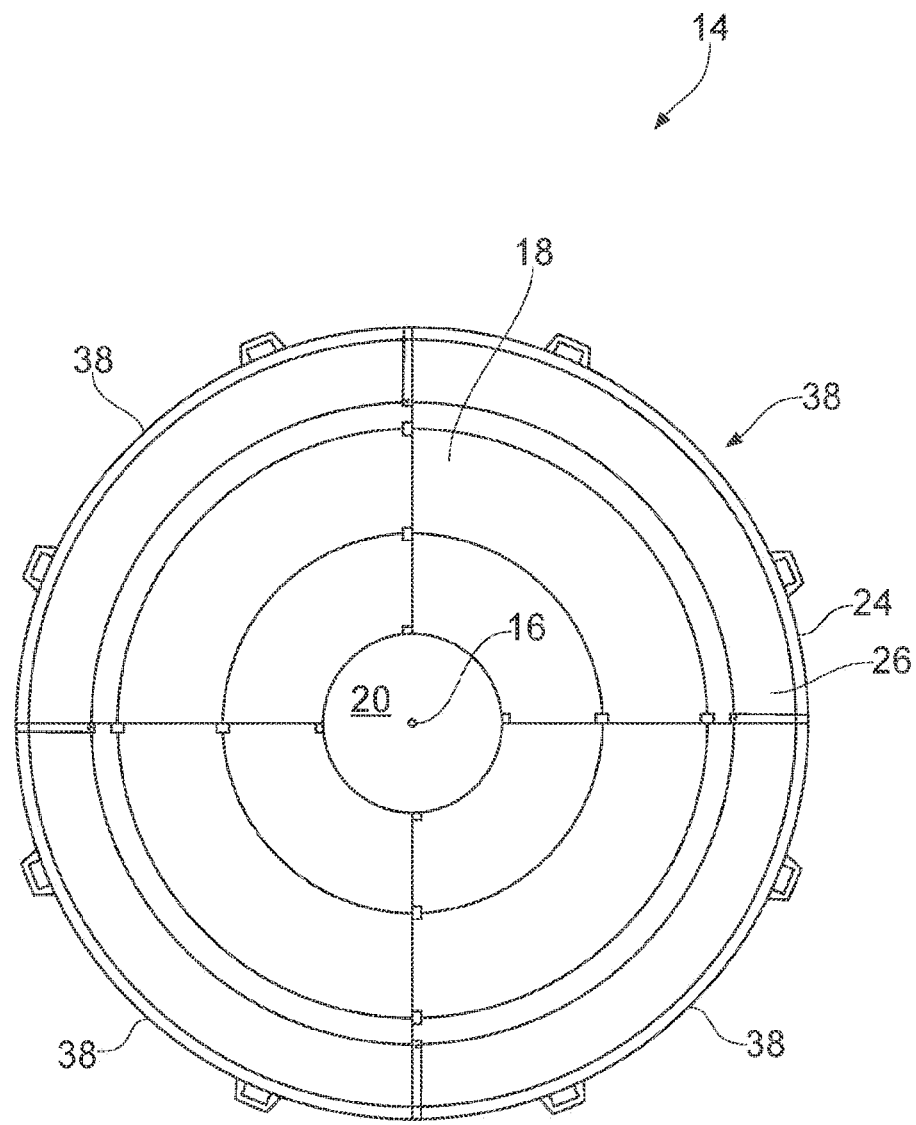
FIG. 4 is a plan view of a tray unit of the separator in a fully assembled state.

FIG. 4 shows a plan view of one of the tray units 14. The tray unit 14 is formed by a plurality of tray sections 38. In this example, the tray unit 14 comprises four tray sections 38. Each of the tray sections 38 has a single wall thickness, and each of the tray sections 38 is identical or substantially identical. The tray sections 38 are separate (i.e. distinct/discrete) components. However, they form a single tray unit 14 when connected together.

Figure 5:
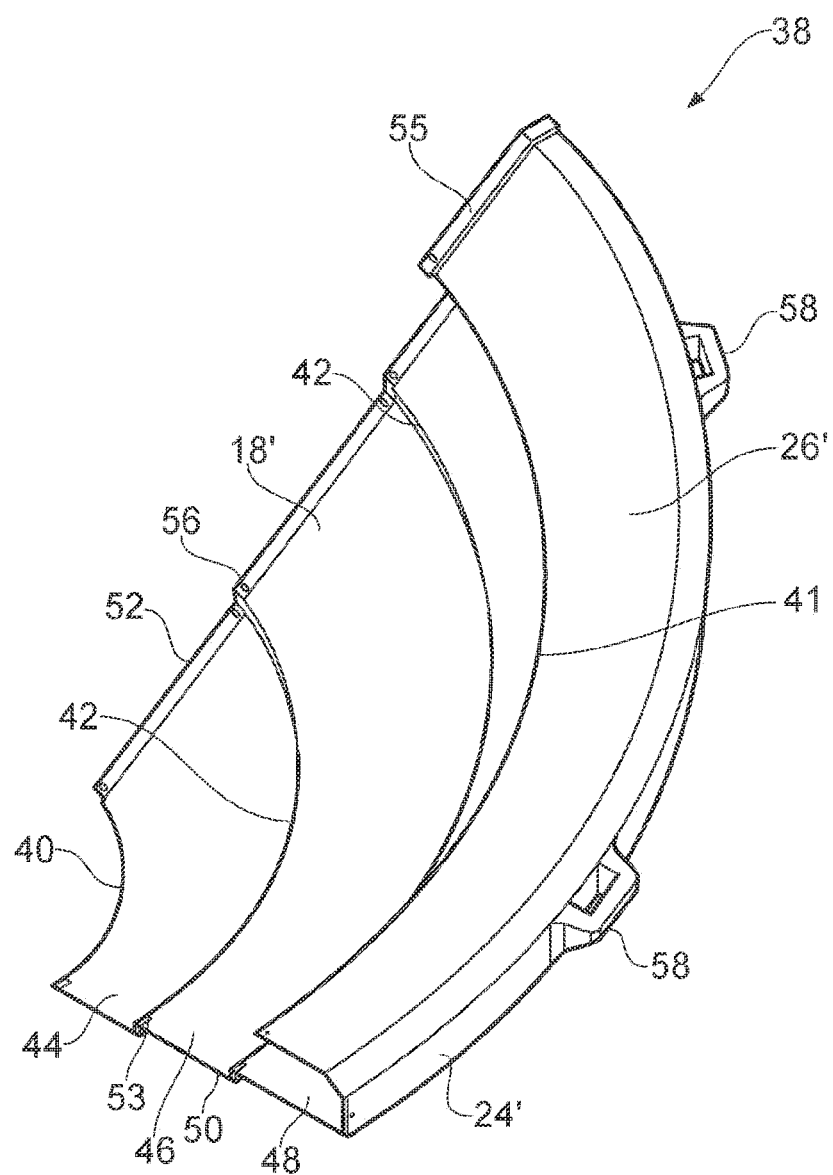
FIG. 5 is a perspective view of a section of the tray unit.

FIG. 5 shows one of the tray sections 38 in isolation. The tray section 38 generally comprises a tray portion 18', a rim portion 24' and a lip portion 26'. The tray portion 18' is substantially in the shape of a frusto-conical sector. The tray portion 18' converges in a downward direction towards an arcuate edge 40. The tray portion 18' comprises a lower portion 44, a middle portion 46 and an upper portion 48 separated by a series of arcuate steps 42 (not shown in FIGS. 1 to 3 and 13 to 17 for clarity). Each arcuate step 42 comprises a vertical face that faces (i.e. is directed) towards the arcuate edge 40. A total of two arcuate steps 42 are shown, which divide the tray portion 18' into the lower portion 44, the middle portion 46 and the upper portion 48. Each of the lower, middle and upper portions 44, 46, 48 are in the shape of a frusto-conical sector. The frusto-conical sectors forming the lower, middle and upper portions 44, 46, 48 are substantially parallel. Each of the arcuate steps form a portion of a cylindrical surface. Each of the arcuate steps are concentric. The rim portion 24' forms a portion of a cylindrical surface. The rim portion 24' extends upwardly from the outer periphery of the tray portion 18'. A pair of lugs (i.e. tabs) 58 protrude outwardly from the rim portion 24'. The lip portion 26' extends radially inwardly from the extremity of the rim portion 24' and terminates at an arcuate edge 41. The radially inward portion of the lip portion 26' is inclined so as to be parallel to the direction of the upper surface of the tray portion 18'.

A first edge 50 of the tray section 38 extends between one end of the arcuate edge 40 of the tray portion 18' and the corresponding end of the arcuate edge 41 of the lip portion 26'. A plurality of metal fasteners 53 are integrated into the tray section 38, adjacent the first edge 50. In the arrangement shown in FIG. 5, two fasteners 53 are provided in each of the lower, middle and upper portions 44, 46, 48, a single fastener 53 is provided in the rim portion 24' and a single fastener 53 is provided in the lip portion 26'. As is more clearly shown in FIG. 7, each fastener 53 comprises a threaded hole 54 for receiving a screw. The threaded hole 54 is a blind hole, and extends from an opening into a boss 57. The threaded hole 54 is a circular hole. The fasteners 53 are integrated into the body of the tray section 38 such that the opening of the threaded hole 54 is on the outer surface of the second tray section 38 and the boss 57 is on the inner surface of the second tray section 38.

Figure 6:
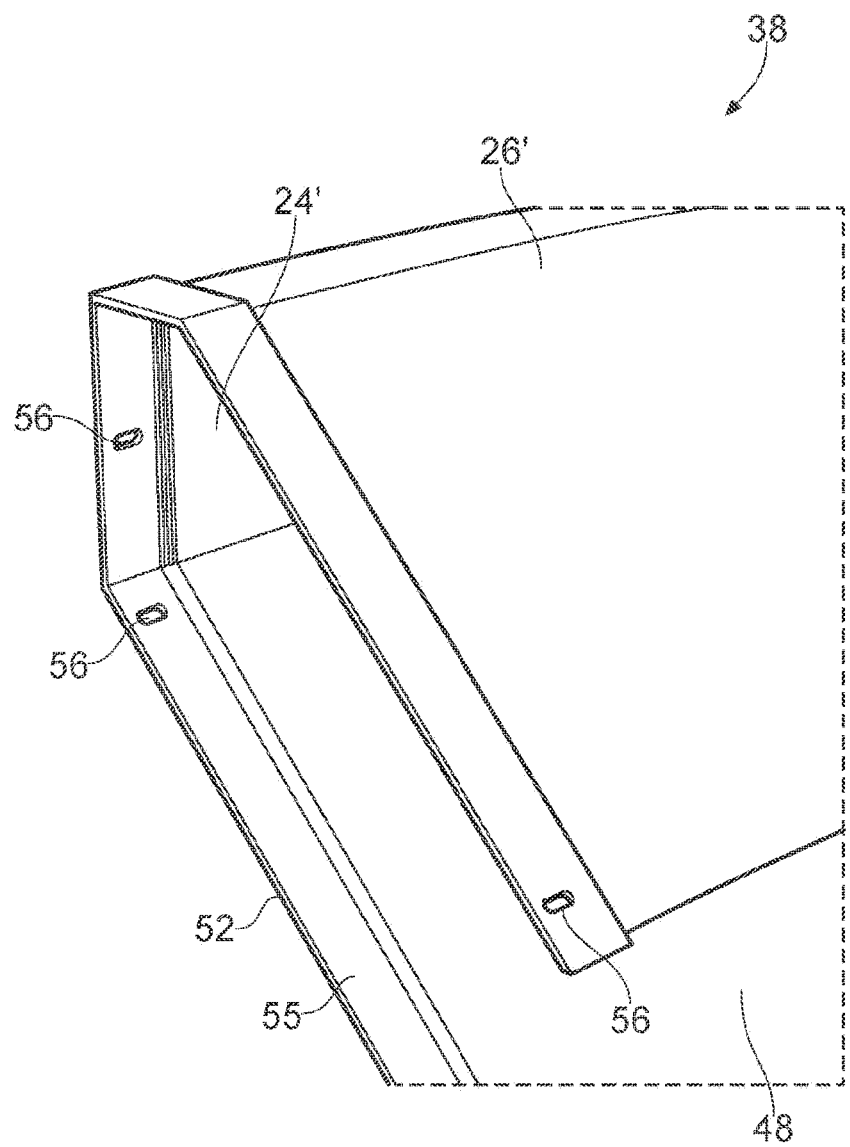
FIG. 6 is a close-up perspective view of the tray section.

A second edge 52 of the tray section 38 extends between the other end of the arcuate edge 40 of the tray portion 18' and the corresponding other end of the arcuate edge 41 of the lip portion 26'. As more clearly shown in FIG. 6, a flange 55 extends along the second edge 52. A plurality of slots 56 extend through the flange 55, adjacent the second edge 50. The number and position of the plurality of slots 56 extending through the tray section 38 adjacent the second edge 52 corresponds to the number and position of the fasteners 53 integrated into the tray section 38 adjacent the first edge 50. The slots 56 are oriented (i.e. have their maximum dimension) in a circumferential direction.

Figure 7:
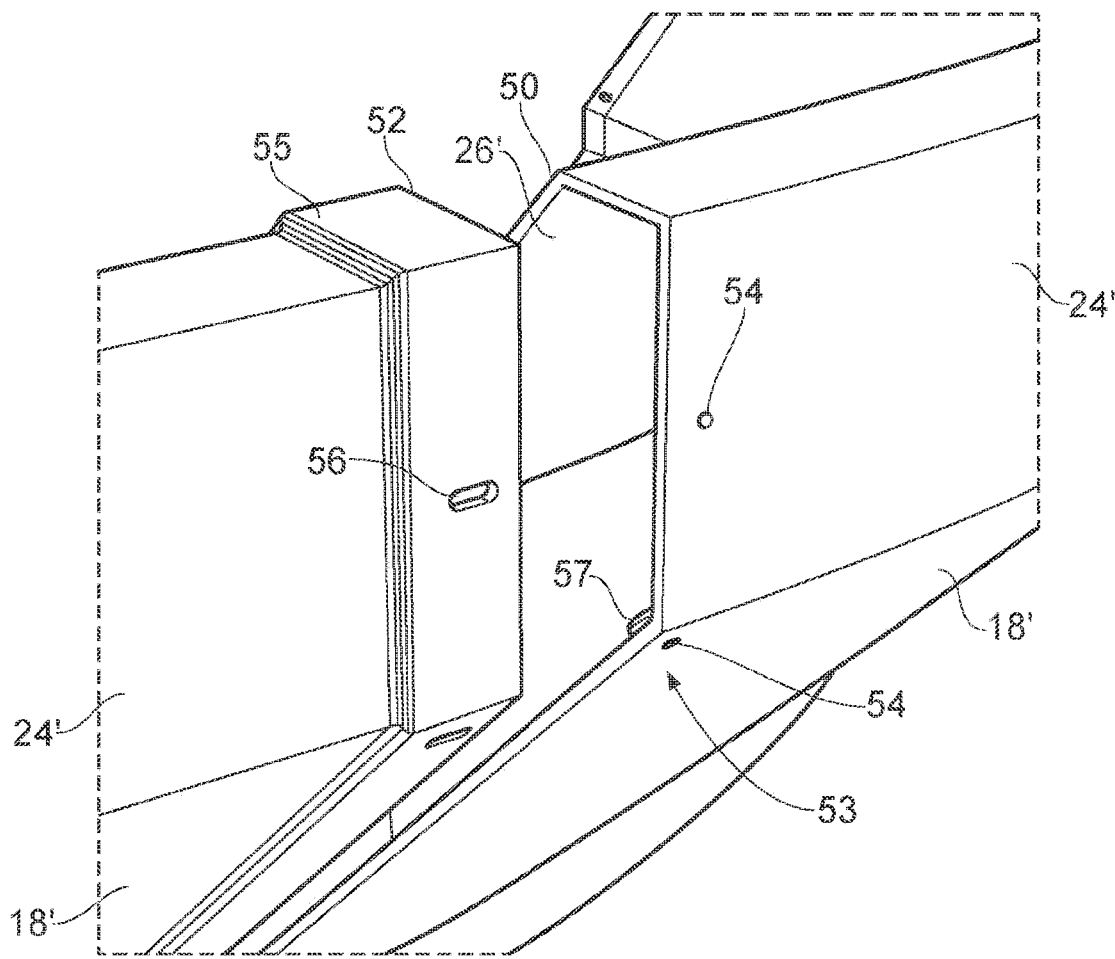
FIG. 7 is a close-up perspective view of two adjacent tray sections separated from each other.
Figure 8:
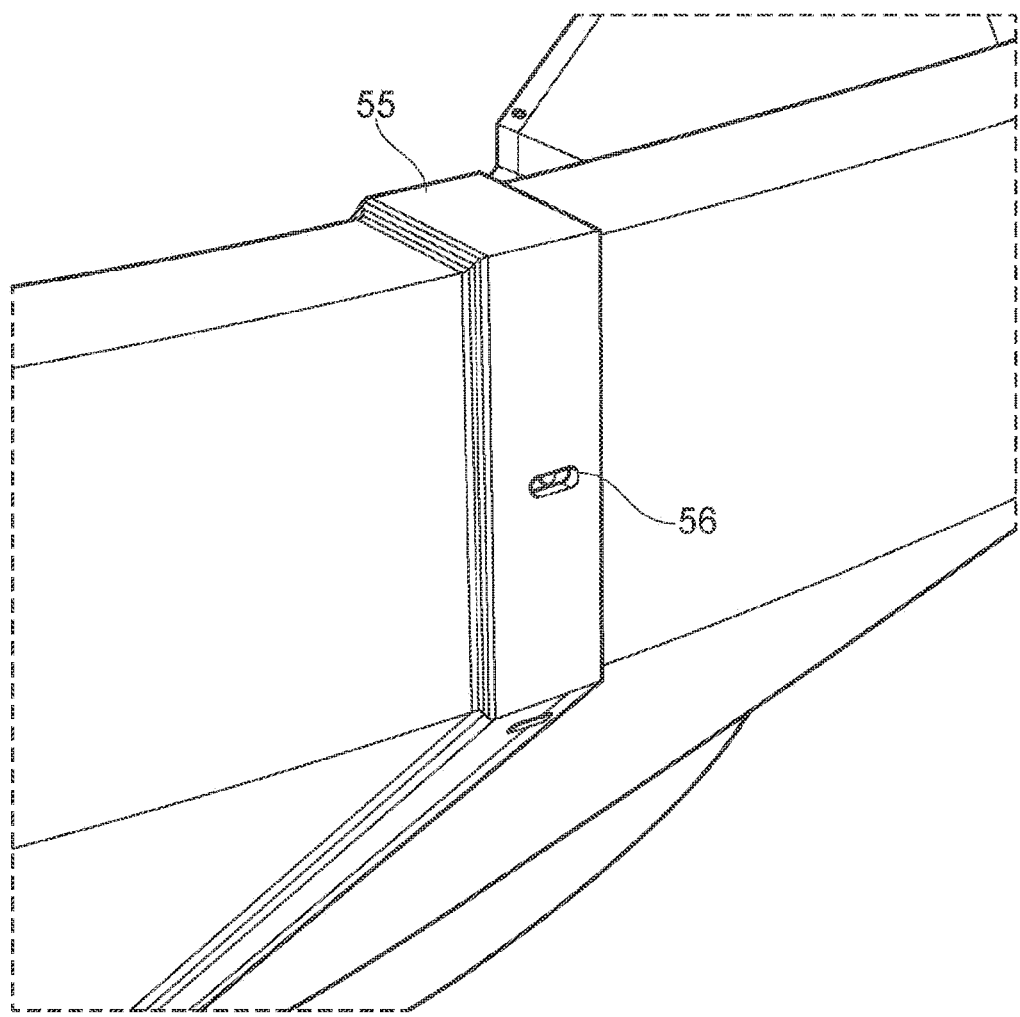
FIG. 8 shows the two adjacent trays in a connected state.

FIG. 7 shows two adjacent tray sections 38 prior to assembly. As shown, the first edge 50 of one of the tray sections is adjacent the opposing second edge 52 of the neighboring tray section. The flange 55 extends in a circumferential direction. As shown, the flange 55 is offset from the remainder of the tray section 38 in an outward direction. In addition, the inner surface of the flange 55 is offset from the inner surface of the remainder of the tray section 38 in an outward direction. The profiles of the portions of the flange 55 formed by the lower, middle and upper portions 44, 46, 48, the arcuate steps 42, the cylindrical rim 24' and the annular lip 26' are substantially parallel to the respective corresponding portions of the remainder of the tray section 38. The extent by which the flange 55 is offset from the remainder of the tray section 38 in an outward direction is such that the profile of the inner surface of the flange 55 of the tray section 38 (i.e. the upper surface of the flange 55 at the tray portion 18', the radially inward-facing surface of the flange 55 at the rim portion 24' and the downward-facing portion of the flange 55 at the lip portion 26') corresponds to the profile of the outer surface of the neighboring tray section 38 (and also of its own outer surface) along the first edge 50 (i.e. the lower surface of the tray portion 18' adjacent the first edge 50, the radially outward-facing surface of the rim portion 24' adjacent the first edge 50 and the upward-facing portion of the lip portion 26' adjacent the first edge 50). The first edge 50 of one of the second tray sections 38 is therefore able to slot into the flange 55 of the neighboring tray section 38, as shown in FIG. 8.

The tray portion 18', the rim portion 24' and the lip portion 26' are integrally formed with each other. The body of the tray section 38 is formed of plastic and manufactured by a rotational molding (i.e. rotomolding or rotamolding) process. The metal fasteners 53 are provided as inserts into the body of the tray section 38 during the rotational molding process.

When the tray sections 38 are assembled together, the tray portions 18' form the tray 18, the rim portions 24' form the cylindrical rim 14 and the lip portions 26' form the annular lip 26. Further, when assembled, the arcuate edges 40 define the aperture 20. In this manner, each of the tray sections 38 forms a sector (in this instance, a quadrant) of the tray unit 14.

Figure 9:
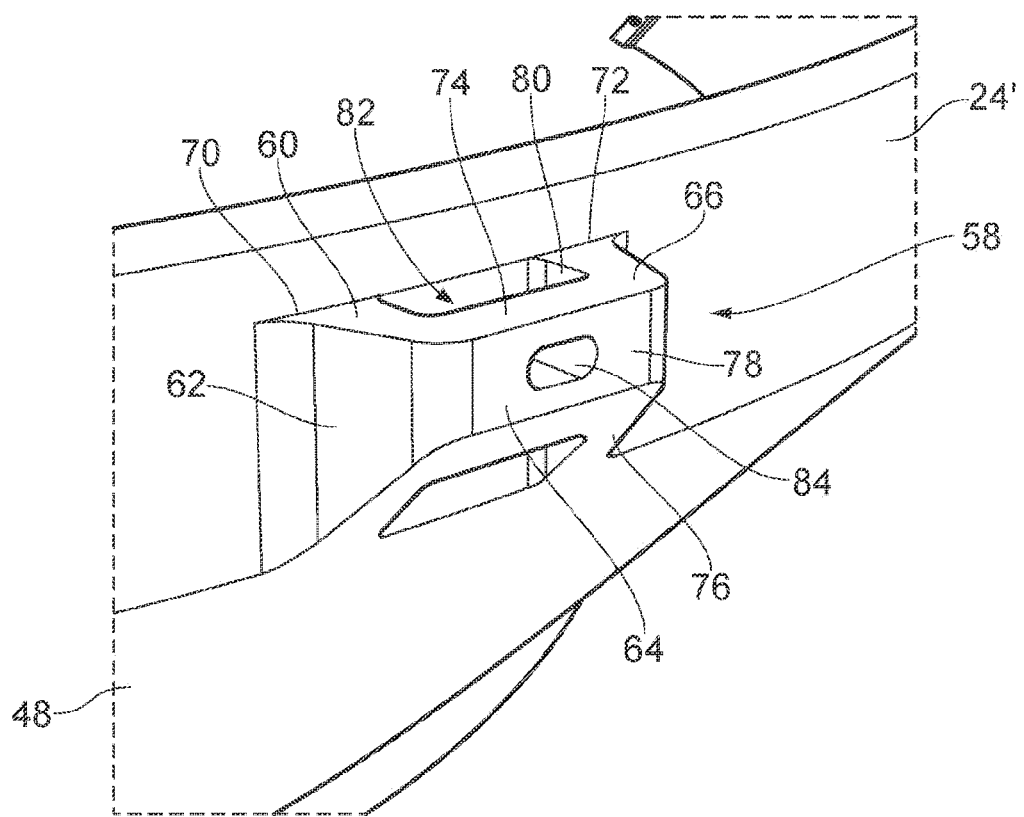
FIG. 9 is a close-up perspective view of a connecting lug of the tray section.
Figure 10:
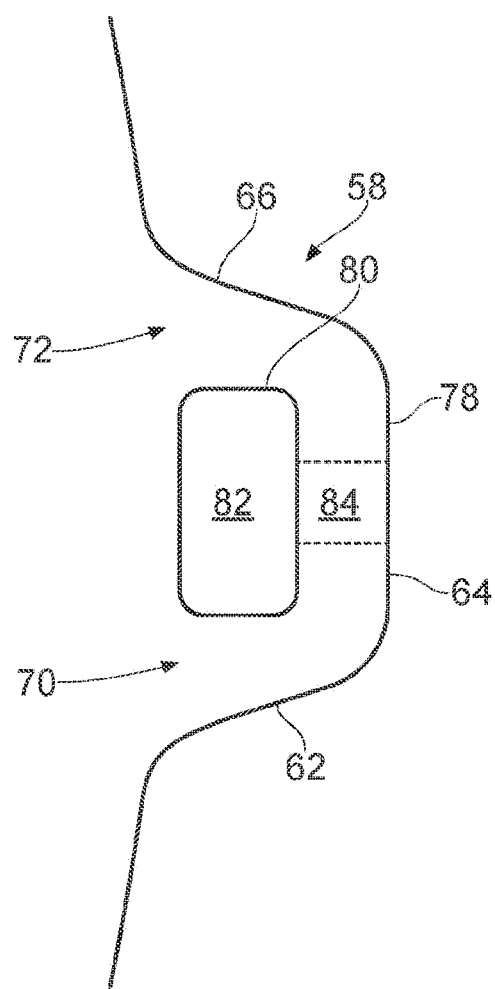
FIG. 10 is a sectional view of the connecting lug.

Reference will now be made to FIG. 9, which shows a close-up view of one of the lugs 58 and FIG. 10 which shows a cross-section through the lug 58. The lug 58 is hollow and comprises an outwardly extending portion 62, a circumferentially extending portion 64 and an inwardly extending portion 66. The outwardly extending portion 62 extends outwardly away from the rim portion 24' where it meets the circumferentially extending portion 64. The circumferentially extending portion 64 extends circumferentially (i.e. around the axis) between the outwardly extending portion 62 and the inwardly extending portion 66. The inwardly extending portion 66 extends inwardly away from the circumferentially extending portion 64 and towards the rim portion 24'. Accordingly, the lug 58 is generally C-shaped. An inlet 70 is formed where the outwardly extending portion 62 meets the rim portion 24', and an outlet 72 is formed where the inwardly extending portion 66 meets the rim portion 24'. The lug 58 is integrally formed with the remainder of the tray section 38.

The outwardly extending portion 62, circumferentially extending portion 64 and inwardly extending portion 66 are defined by an upper surface 74, a lower surface 76, a radially outer surface 78 and a radially inner surface 80. The lower surface 76 forms a continuation of the tray portion 18' and so is inclined. The upper surface 74 extends substantially horizontally and is offset downwards from the lip portion 26'.

The radially inner surface 80 and an opposing portion of the rim portion 24' together define a vertical through hole 82. The vertical through hole 82 extends between the upper surface 78 and the lower surface 76 of the lug 58. As shown in FIGS. 9 and 10, the vertical through hole 82 is a slot (i.e. an elongate opening). The vertical through hole 82 is oriented (i.e. has its maximum dimension) in a circumferential direction. In alternative arrangements the vertical through hole 82 need not be a slot (i.e. it need not be an elongate opening). A horizontal slot 84 also extends through the circumferentially extending portion 64, between the outer and inner surfaces 78, 80. The horizontal slot 84 is also oriented (i.e. has its maximum dimension) in a circumferential direction. In alternative arrangements the horizontal slot 84 can be a horizontal hole that is not a slot (i.e. it need not be an elongate opening). The horizontal slot 84 is formed by an enclosed channel (i.e. a tunnel) extending through the circumferentially extending portion 64. Accordingly, the lug 58 defines a completely enclosed passageway.

The passageway has a substantially rectangular vertical cross-section along its length. Since the vertical through hole 82 and the horizontal slot 84 are elongate and have their maximum dimension in a circumferential direction, the effect of the vertical through hole 82 and the horizontal slot 84 on the ability of fluid to pass along the passageway is minimized. The lug 54 as a whole is elongate and has its maximum dimension in a circumferential direction, which further encourages the passage of fluid along the passageway. The outer vertical surface 78 of the outwardly and inwardly extending portions 62, 66 are angled towards each other. The inner vertical surface 80 of the outwardly and inwardly extending portions 62, 66 are parallel to each other, and extend perpendicular to the rim portion 24'. Further, as described previously, the lower surface 76 is inclined whereas the upper surface 74 is horizontal. The outwardly extending portion 62 and the inwardly extending portion 66 thus taper (i.e. reduce) from the inlet 70 and the outlet 72 respectively.

The corner edges formed between the inner surface 80 and the rim portion 24' are rounded, as are the corner edges of the inner surface 80 formed at the transitions between the outwardly and inwardly extending portions 62, 66 and the circumferentially extending portion 62.

Figure 11:
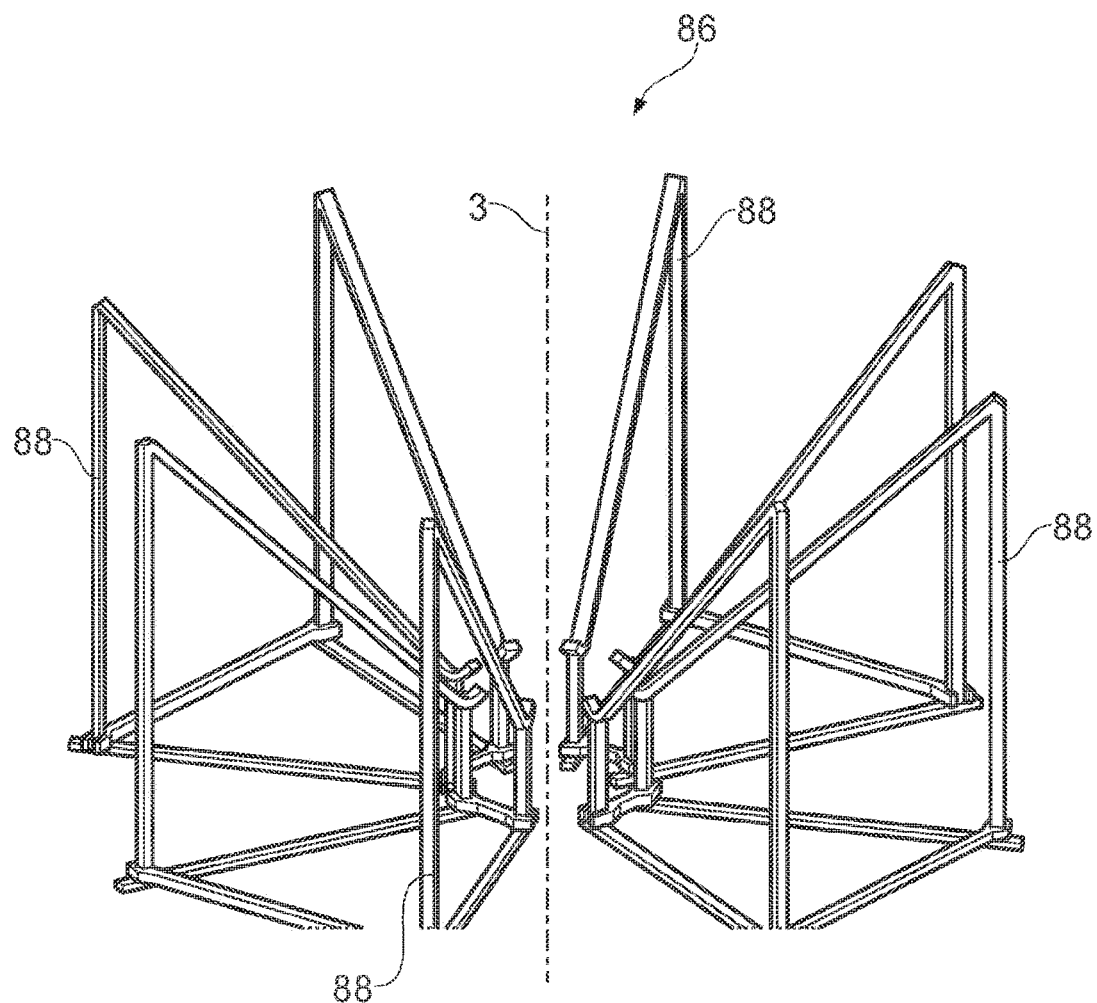
FIG. 11 is a perspective view of a jig for assembling a tray assembly.

FIG. 11 shows a jig 86 for assembling a plurality of assembled tray units 14 together. The jig 86 comprises a plurality of jig frames 88 arranged around an axis 3. The jig frames 88 are spaced an equal distance apart from each other. A total of four jig frames 88 are shown in FIG. 10. Each of the jig frames 88 is substantially identical.

Figure 12:
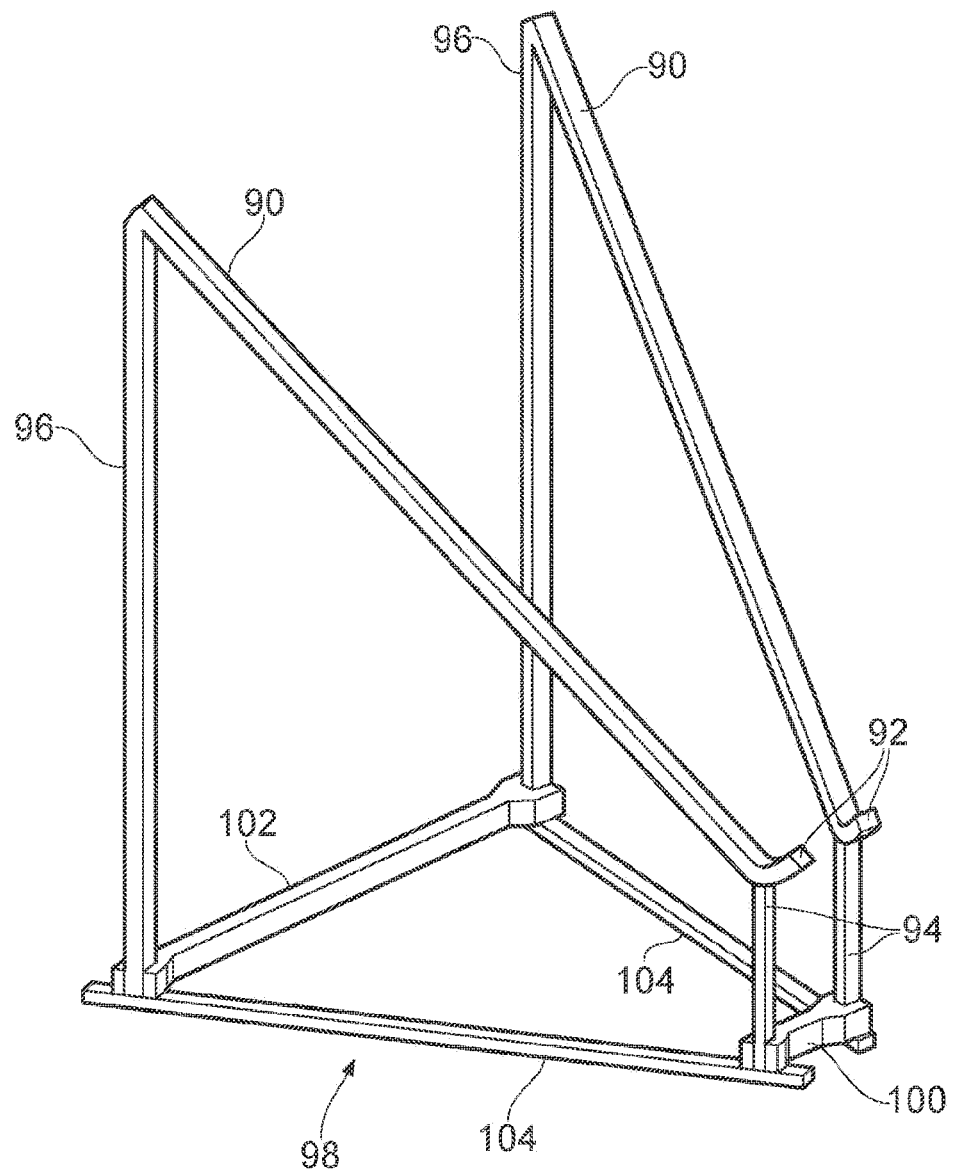
FIG. 12 is a perspective view of a jig frame of the jig.

FIG. 12 shows one of the jig frames 88 in isolation. The jig frame 88 comprises a pair of support members 90 which extend in a downward direction towards the axis 3. An upwardly extending lip 92 projects from each support member 90 at its radially inner end. The support members 90 are supported at their radially inner ends by first vertical posts 94 and at their radially outer ends by second vertical posts 96. The first and second pairs of vertical posts 94, 96 are supported by a base 98. The base 98 comprises an inner base member 100 extending between lower ends of the first vertical support members 94, an outer base member 102 extending between lower ends of the second vertical support members 96 and a pair of radial base members 104 each extending radially between the lower end of one of the first vertical posts 94 and the lower end of a corresponding second vertical post 94.

Figure 13:
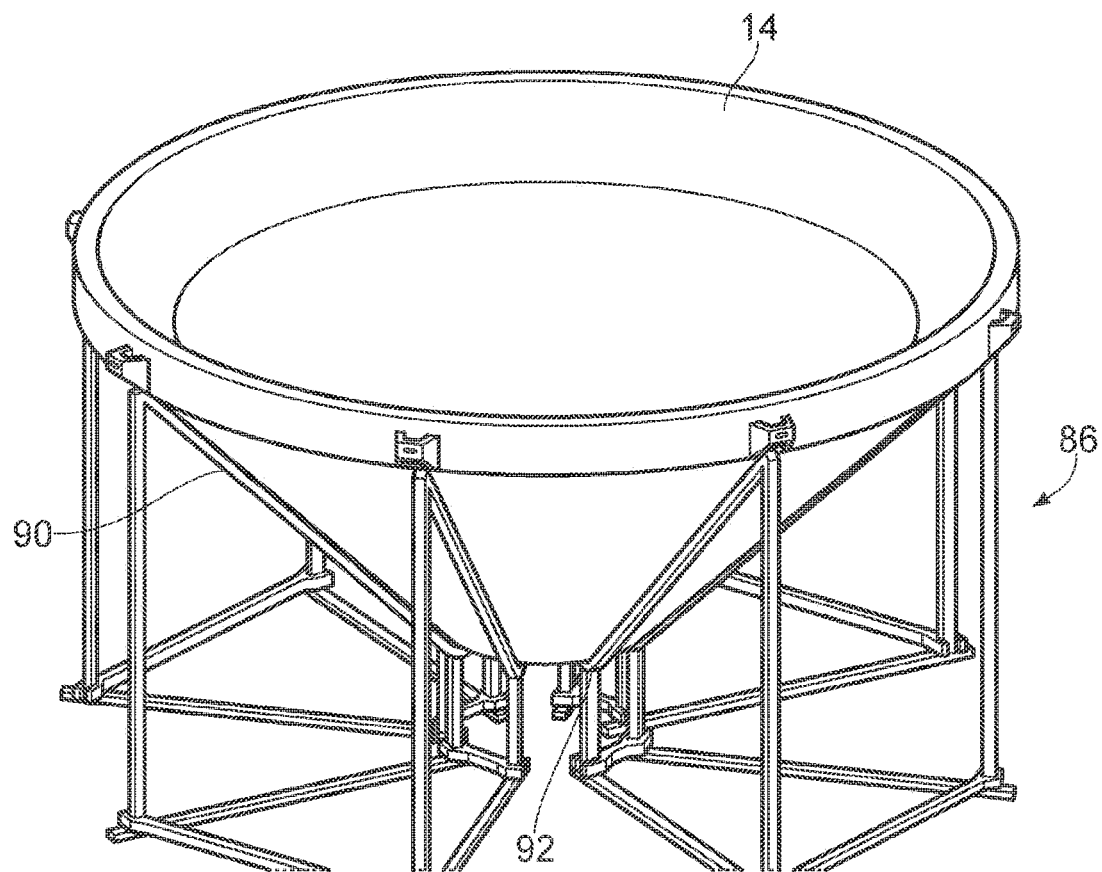
FIG. 13 shows the jig in use during a first step of an assembly process.

To form a tray assembly 4 from a plurality of tray sections 38, a single tray section 38 is placed on each of the jig frames 88, as shown in FIG. 13. The support members 90 support the lower surfaces of the tray portions 18'. The upwardly extending lips 92 support the arcuate edges 40 of the tray sections 38. The jig 86 provides shape and structure to an otherwise relatively unstable set of components, prior to securing the tray sections 38 and tray units 14 together. Further, the jig 86 positions the tray sections 38 in the correct relative positions prior to securing of the tray sections 38 together.

The tray sections 38 are assembled such that the inner surface of the flange 55 of each first tray section 38 abuts the outer surface of a neighboring tray section 38 adjacent its first edge 50, as shown in FIG. 8. The slots 56 of each tray section 38 align with the threaded holes 54 of the neighboring tray section 38 and they are secured to one another by inserting a screw or bolt (not shown) through each of the slots 56 and screwing it into the threaded holes 54 of the fastener 53. The circumferentially-oriented slots 56 allow the spacing between the tray sections 38 to be varied slightly to allow for manufacturing tolerances. Since the threaded holes 54 are blind holes, fluid, grit and debris are unable to pass from the upper surface of the trays 18 to the lower surface of the trays 18 through the threaded holes 54.

Figure 14:
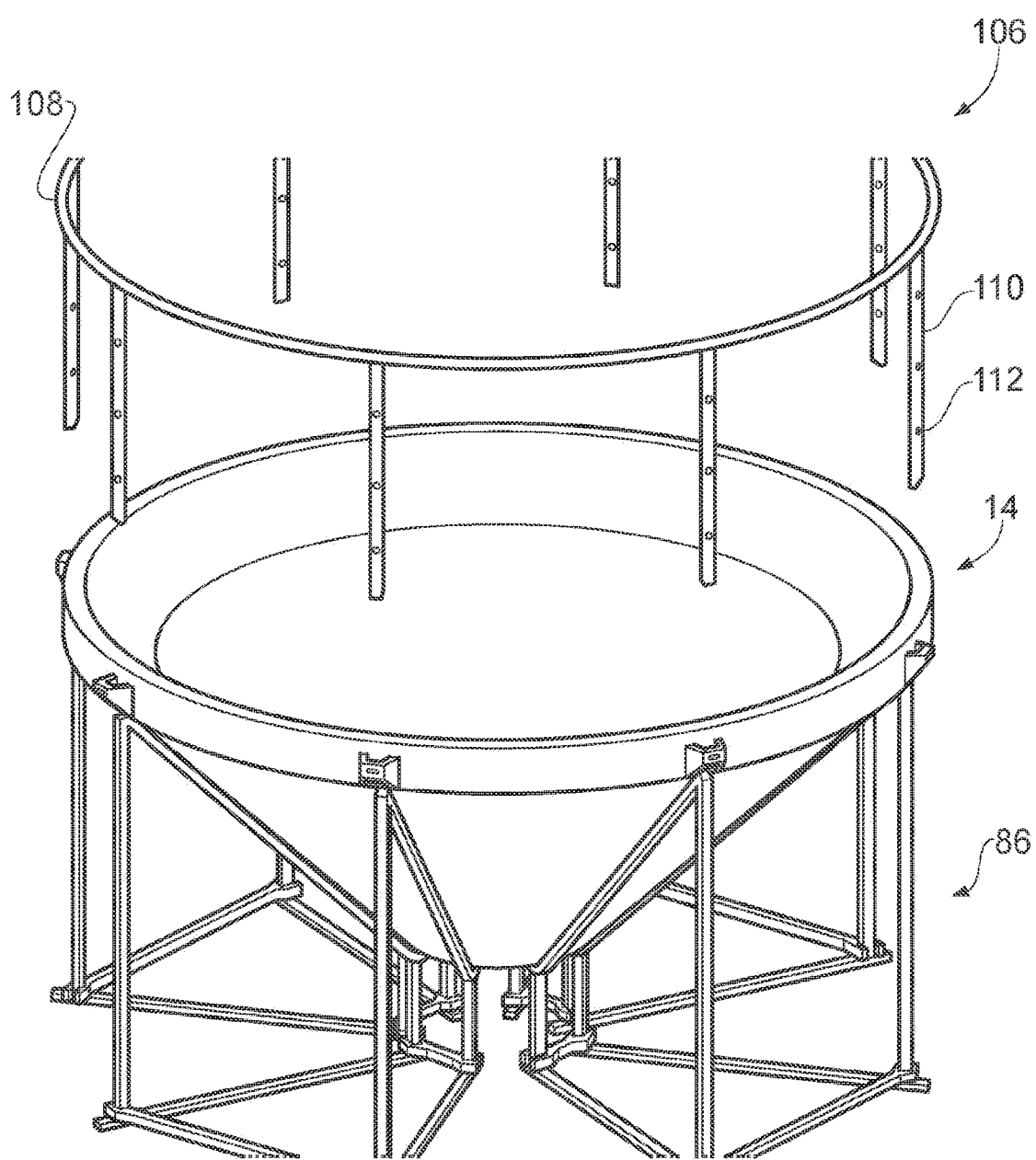
FIG. 14 shows a second step of the assembly process.

Once all of the tray sections 38 have been connected together in this manner, the support frame 106 is positioned above the tray unit 14 and the jig 86, as shown in FIG. 14. The support frame 106 comprises a circular ring 108 from which a plurality of connecting members 110 (or legs) extend in an axial direction. A total of eight connecting members 110 are shown in FIG. 14, which corresponds to the number of lugs 58 of the tray sections 38. The connecting members 110 are separated by a distance which is equal to the distance between the vertical through holes 82 formed in the lugs 58. The distance between the lugs 58 of a single tray section 38 may be the same as the distance between the adjacent lugs 58 of the neighboring tray sections 38 such that the legs are all spaced equally around the ring 108. The radius of the ring 108 is substantially equal to the desired distance between the center of the tray units 14 and the vertical through holes 82. The connecting members 110 each have a plurality of radially extending threaded holes 112 (i.e. securing holes 112) spaced along their length for connecting the tray units 14 to the connecting members 110.

Figure 15:
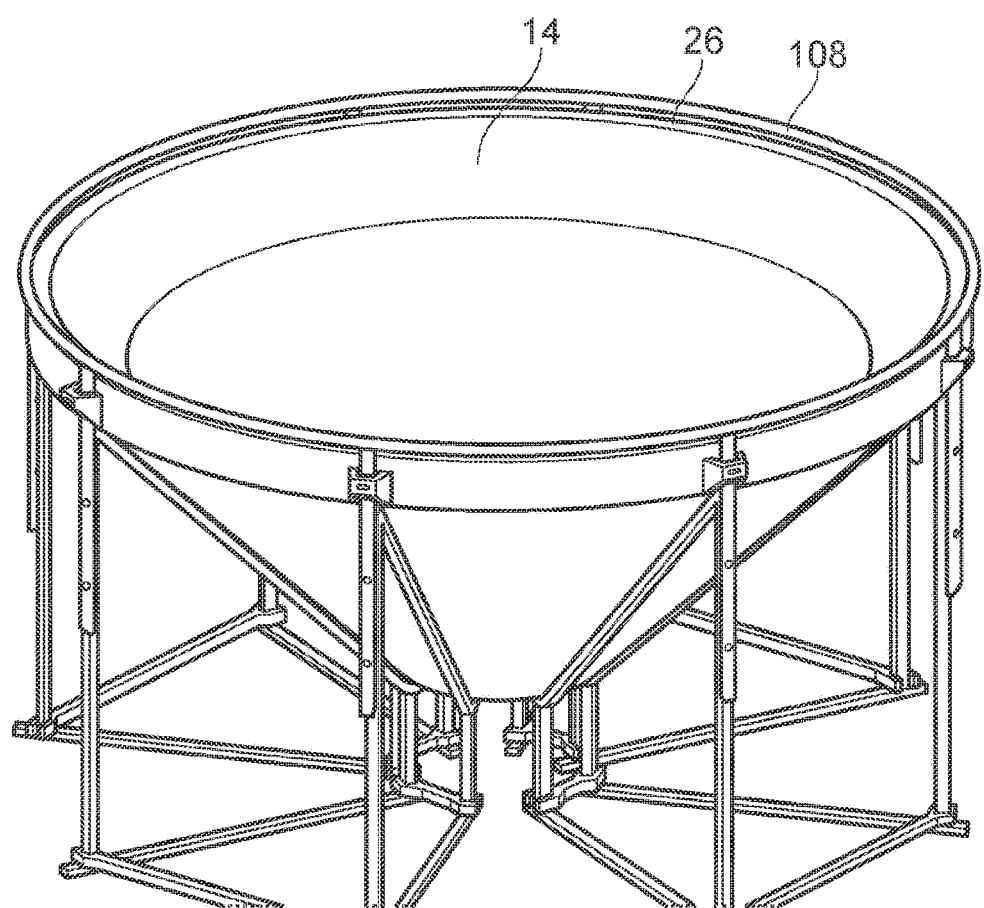
FIG. 15 shows a third step of the assembly process.

The support frame 106 is aligned with the first tray unit 14, such that the connecting members 110 are aligned with the through holes 82 of the first tray unit 14, as shown in FIG. 14. The connecting members 110 are then inserted through the through holes 82, until the circular ring 108 is adjacent the annular lip 26 of the first tray unit 14. The resulting arrangement is shown in FIG. 15. The first tray unit 14 is then independently fixedly secured to the support frame 106 (in particular to the connecting members 110 thereof) by inserting a screw or bolt (not shown) through the slots 84 and into the respective securing holes 112 of the connecting members 110.

Figure 16:
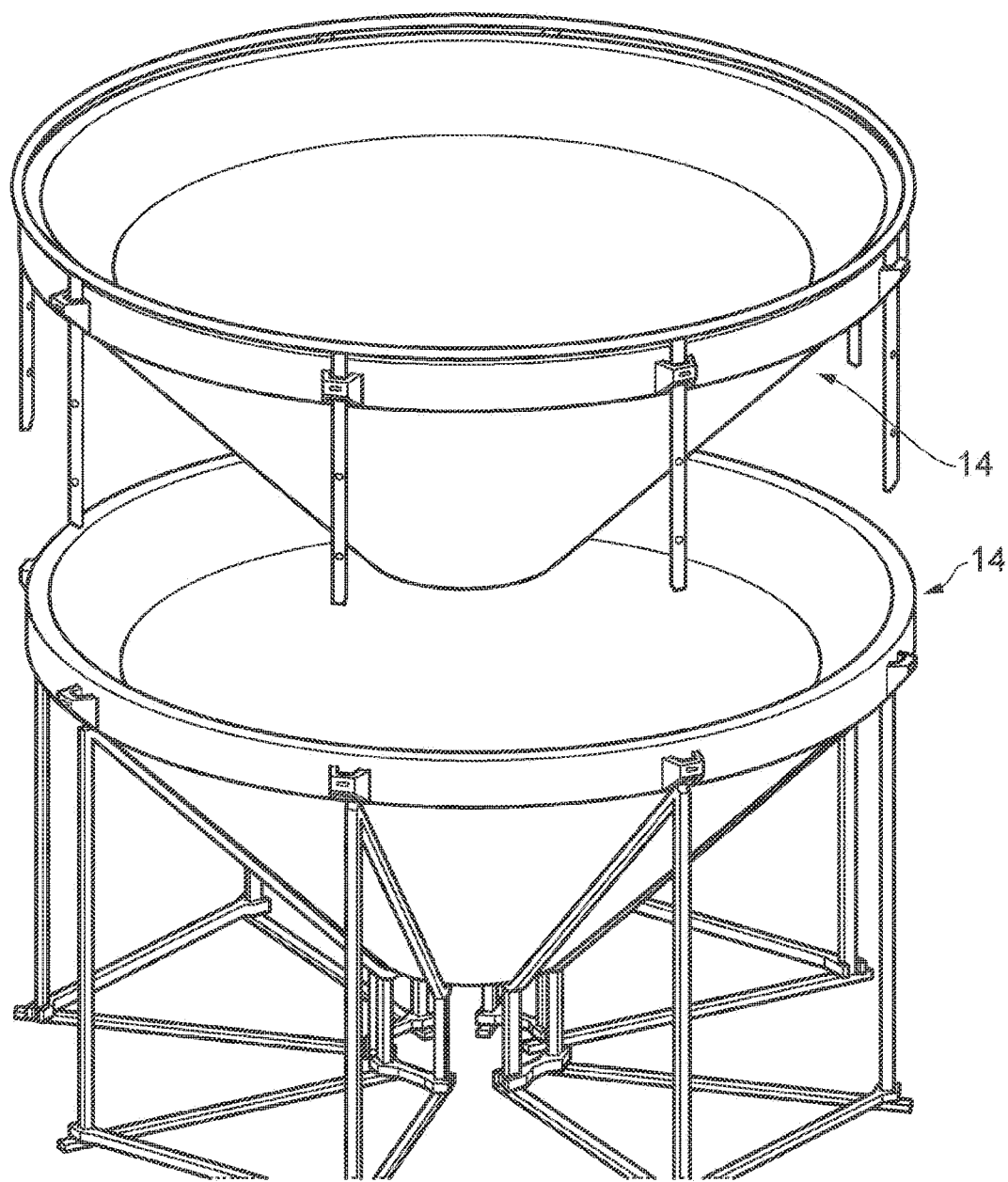
FIG. 16 shows a fourth step of the assembly process.

Once the support frame 106 is secured to the first tray unit 14, the tray unit 14 can be raised such that the first tray unit 14 is lifted off the jig 86. A second tray unit 14 is then placed on the jig 86 in a similar manner as described previously. The resulting arrangement is shown in FIG. 16.

The same process as described above is then repeated so as to assemble a second tray unit 14 from a plurality of tray sections 38, and to attach the second tray unit 14 to the connecting members 110. The second tray unit 14 is attached to the connecting members 110 such that the tray units 14 are axially spaced apart from each other. The separation of the tray units 14 is determined by the spacing of the securing holes 112 along the connecting members 110. The same process is then repeated for a third tray unit 14 (and any subsequent units), thus forming a complete tray assembly 4.

Each of the tray units 14 are independently fixedly secured to the connecting members 110 of the support frame 106. The tray units 14 are fixedly secured to the connecting members 110 in the sense that they are substantially unable to move relative to the connecting members 110 when they are secured thereto, for example by sliding along the connecting members 110. The tray units 14 are independently fixedly secured to the connecting members 110 in the sense that none of the tray units 14 require the presence of any of the other tray units 14 in order to be fixedly secured to the connecting members 110.

Figure 17:
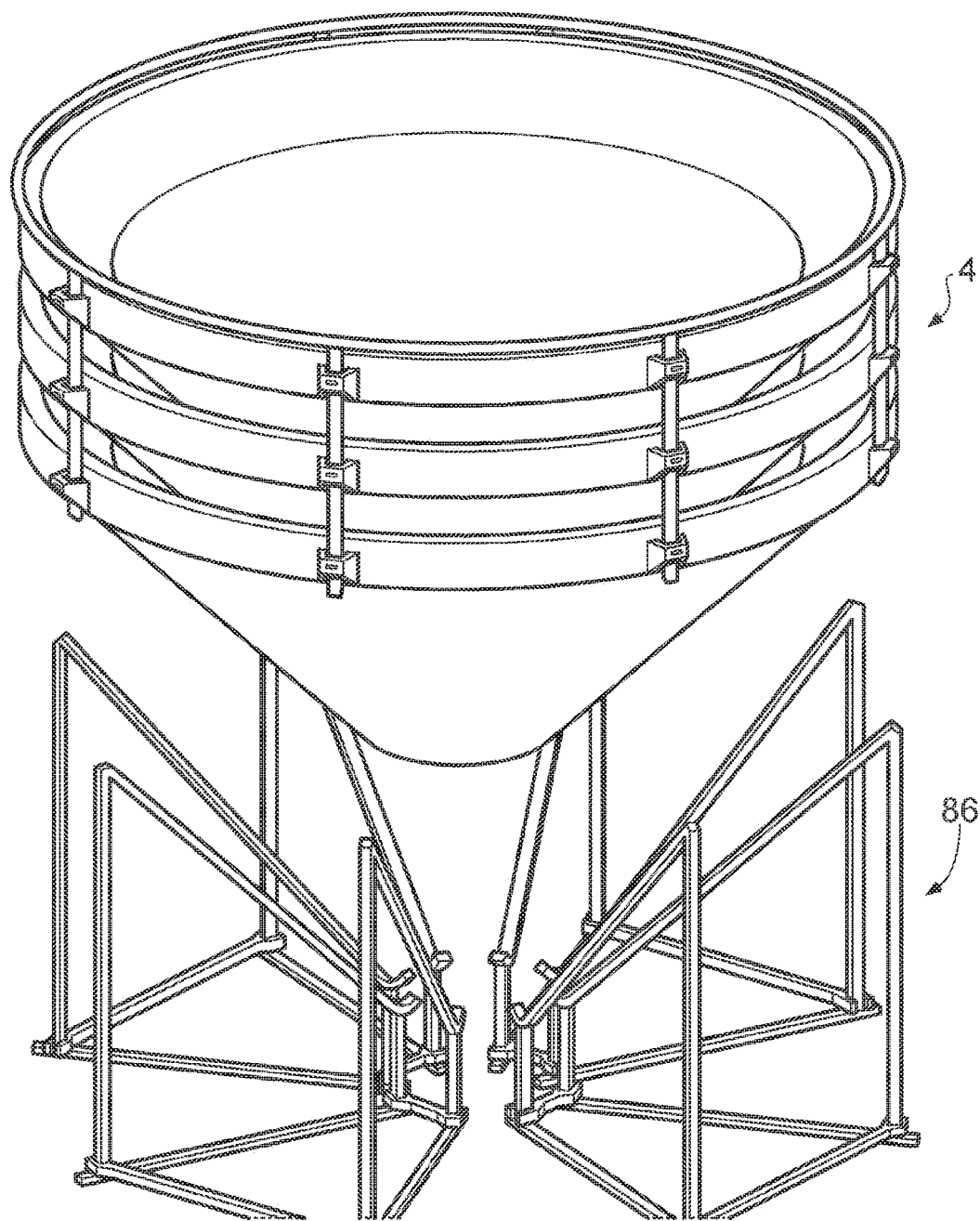
FIG. 17 shows a fifth step of the assembly process.

The tray assembly 4 can then be lifted from the jig 86, as shown in FIG. 17, and installed into a treatment vessel, as shown in FIGS. 1 to 3. Additional tray units 14 can be secured to the support frame 106, provided the connecting members 110 are sufficiently long.

In use, grit settles on the upper surface of the trays 18 of the tray units 14, migrates along the upper surface under the force of gravity and passes through the aperture 20. Since the tray units 14 comprise a plurality of tray sections 38 rather than being formed of a single piece, the structural rigidity of the tray units 14 is improved. The structural rigidity of the tray units 14 is also improved by the steps 42 formed around the tray 18. Further, since the tray 18 slopes downwards towards the aperture 20, the steps 42 do not interfere with the migration of the grit to the aperture 20.

In use, low energy vortex flow is established between adjacent tray units 14. A portion of the flow inside the tray 18 adjacent the rim 24 is able to pass through the passageway formed by the lug 58. Specifically, the flow enters the lug via the inlet 70, passes along the outwardly extending portion 62, along the circumferentially extending portion 64, along the inwardly extending portion 66 and out of the lug 58 via the outlet 72. The arrangement of the lug 58, which does not protrude into the interior of the tray unit 14, minimizes the impact of the lug 58 on the vortex flow, as well as minimizing its impact on tray settling patterns. Further, such an arrangement prevents ragging debris being collected within the tank. By enabling the wastewater to flow in this manner, the impact on the vortex flow by the lugs 58 is minimized. Further, since the lugs 58 are integrally formed with the remainder of the tray section 38, a separate step of attaching the lugs 58 to the remainder of the tray section 38 is not required.

As described previously, the body of the tray section 38 is rotationally molded. Rotationally molded items are known to experience large shrinking rates during cooling. By forming the tray units 14 out of a plurality of tray sections 38 rather than a single component, the effects of shrinking are mitigated, particularly for large components. This results in an accurate, repeatable, efficient and quick manufacturing process that results in a tray unit 14 of improved quality.

Although it has been described that each tray unit 14 comprises four tray sections 38, each tray unit 14 may comprise any number of tray sections 38. The size of the tray units 14 can be increased by increasing the number of tray sections 38 used to form each tray unit 14. Large tray units 14 that would otherwise be difficult or impossible to transport can instead be transported as individual tray sections 38, thereby reducing the cost and difficulty of transport.

It has been described that each of the tray sections 38 has a single wall thickness. However, the tray sections 38 may instead have double wall thickness. Double wall thickness may increase the strength and rigidity of the tray sections 38. Double wall thickness can be used in addition to or as an alternative to the steps 42. Likewise, ribs could be provided as an alternative to or in addition to the steps 42 or double wall thickness. Ribs could be provided on the underside of the tray 18, so as to avoid interfering with the migration of grit to the aperture 20. The ribs could be circular, as per the steps 42, for example.

Although certain features, such as the lugs 58, have been described in the context of a tray unit 14 comprising multiple tray sections 38, where possible, they may also be implemented in unitary tray units 14.

Alternative manufacturing processes other than rotational molding could be used to manufacture the tray sections 38 or tray units 14. The tray sections 38 or tray units 14 could be manufactured using vacuum forming, thermoforming, or any other suitable manufacturing process.

Although it has been described that the tray units 14 are used in a stacked tray separator, the tray units 14 may instead be used in other wastewater separators, such as hydrodynamic vortex separators.

It has been described that the tray sections 38 are connected together and to the connecting members 110 by way of threaded fasteners and holes. However, any type of connection or fastening device may be used.

It has been described that each of the tray sections 38 is identical or substantially identical. However, alternative arrangements may comprise first and second types of tray sections 38. The first type of tray section 38 may comprise a first flange 55 extending along its first edge 50 and a second flange 55 extending along its second edge 52. Both the first and second edges 50, 52 of the first type of tray section 38 may therefore correspond to the second edge 52 of the abovementioned arrangement. In contrast, the second type of tray section 38 may not have any flanges 55. Both the first and second edges 50, 52 of the second type of tray section 38 may therefore correspond to the first edge 50 of the abovementioned arrangement. The tray sections 38 may be arranged as per the abovementioned arrangement, but with alternating first and second types of tray sections 38.

The invention claimed is:

1. A tray unit for a wastewater treatment device, the tray unit having a substantially frusto-conical profile defining an axis and a central aperture, the tray unit comprising a plurality of distinct tray sections arranged around the axis, each tray section comprising a portion of the substantially frusto-conical profile of the tray unit and being connectable to one or more of the other tray sections so as to form the tray unit,
wherein each tray section comprises a first edge region and a second edge region, the first edge region being connectable to the second edge region of an adjacent tray section and the second edge region being connectable to the first edge region of an adjacent tray section,
wherein the first edge region comprises at least one hole for connecting the first edge region to the second edge region of an adjacent tray section, and the second edge region comprises at least one corresponding slot for connecting the second edge region to the first edge region of an adjacent tray section.

2. A tray unit as claimed in claim 1, wherein the at least one slot is oriented in a circumferential direction with respect to the axis.

3. A tray unit as claimed in claim 1, wherein each tray section comprises a flange, wherein the flange defines the first or second edge region.

4. A tray unit as claimed in claim 3, wherein the flange is offset from a central portion of the tray unit in an outward direction.

5. A tray unit as claimed in claim 1, wherein at least one of the tray sections comprises at least one connecting lug, wherein the or each connecting lug defines a through hole for receiving a support member.

6. A tray unit as claimed in claim 5, wherein the connecting lug is integrally formed with the remainder of the tray section.

7. A tray unit as claimed in claim 5, wherein the connecting lug comprises a hollow channel extending between an inlet and an outlet, the inlet and the outlet being formed in an outer rim of the tray section.

8. A tray unit as claimed in claim 5, wherein the tray sections are substantially identical.

9. A tray unit for a wastewater treatment device, the tray unit having a substantially frusto-conical profile defining an axis and a central aperture, the tray unit comprising an outer rim, the tray unit being configured to receive a flow of fluid within the outer rim, the tray unit comprising at least one connecting lug defining a hole for receiving a support member, the at least one connecting lug being integrally formed with the remainder of the tray unit, wherein the connecting lug comprises a hollow channel extending between an inlet and an outlet, wherein the inlet is formed in the outer rim for receiving a portion of the fluid from within the outer rim, wherein the hollow channel is configured for passage of the portion of the fluid from the inlet to the outlet, and wherein the outlet is formed in the outer rim for discharging the portion of the fluid from the hollow channel to within the outer rim.

10. A tray unit as claimed in claim 9, wherein the frusto-conical profile of the tray unit is formed by a plurality of portions separated by steps to increase the rigidity of the tray unit.

11. A tray unit as claimed in claim 9, wherein the tray unit has a single wall thickness.

12. A tray unit as claimed in claim 9, wherein the tray unit or tray sections are rotationally molded.

13. A tray assembly for a wastewater treatment device, the tray assembly comprising a plurality of tray units as claimed in claim 9 and one or more support members, wherein each of the plurality of tray units are secured to at least one of the one or more support members such that the tray units are spaced apart from each other along the axis.

14. A wastewater treatment device comprising a tray unit as claimed in claim 9.

15. A method of assembling a tray assembly for a wastewater treatment device, the method comprising the steps of:
provingding a plurality of tray units, the tray units each having a substantially frusto-conical profile and a central aperture, the tray units each comprising an outer rim, the tray units each being configured to receive a flow of fluid within the outer rim, the tray units each comprising a plurality of connecting lugs each defining a hole and each comprising a hollow channel extending between an inlet and an outlet, wherein each inlet is formed in the outer rim for receiving a portion of the fluid from within the outer rim, wherein each hollow channel is configured for passage of the portion of the fluid from the inlet to the outlet, and wherein each outlet is formed in the outer rim for discharging the portion of the fluid from the hollow channel to within the outer rim;
attaching a first one of the tray units to a plurality of support members by inserting the support members through the hole of the connecting lug of the first tray unit and securing the first tray unit to the support member; and
attaching a second one of the tray units to the plurality of support members by inserting the support members through the hole of the connecting lug of the second tray unit and securing the second tray unit to the support member to form an assembly of tray units.

16. A method as claimed in claim 15, wherein, prior to and during attachment to the support members, each of the tray units is supported by a jig, wherein the first tray unit is removed from the jig following attachment to the support members by raising the assembly and is replaced on the jig by the second tray unit.

17. A method as claimed in claim 16, wherein the jig comprises a plurality of separate jig frames.

18. A method as claimed in claim 15, further comprising assembling a plurality of separate tray sections to form each of the tray units.

19. A method as claimed in claim 18, wherein, prior to and during attachment to the support members, each of the tray units is supported by a jig, wherein the first tray unit is removed from the jig following attachment to the support members by raising the assembly and is replaced on the jig by the second tray unit, wherein the jig comprises a plurality of separate jig frames, and wherein each of the tray sections is supported by each of the jig frames.

20. A method as claimed in claim 19, wherein the jig frames are used to support and maneuver the tray sections during assembly of each tray unit.

21. A method as claimed in claim 15, wherein the support members extend from a ring.

* * * * *